United States Patent [19]

Sugimoto

[11] Patent Number: 4,975,139
[45] Date of Patent: Dec. 4, 1990

[54] PROCESS FOR PREPARATION OF RUBBER LAMINATE

[75] Inventor: Osamu Sugimoto, Kawasaki, Japan

[73] Assignee: Nippon Zeon Co., Ltd., Tokyo, Japan

[21] Appl. No.: 369,878

[22] Filed: Jun. 22, 1989

[30] Foreign Application Priority Data

Jun. 23, 1988 [JP] Japan .................................. 63-155821

[51] Int. Cl.$^5$ .............................................. B32B 31/26
[52] U.S. Cl. .............................. 156/307.1; 156/244.13; 428/36.8; 428/36.91; 428/413; 523/451
[58] Field of Search ........................ 156/307.1, 244.13; 428/36.8, 413, 36.91; 523/451

[56] References Cited

U.S. PATENT DOCUMENTS 4,343,861 8/1982 Stivers .................................. 428/413

Primary Examiner—John J. Gallagher
Attorney, Agent, or Firm—Armstrong, Nikaido, Marmelstein, Kubovcik & Murray

[57] ABSTRACT

Disclosed is a process for the preparation of a rubber laminate, which comprises bringing an uncured composition comprising a fluororubber and a metal oxide incorporated therein into contact with an uncured composition comprising an epoxy group-containing acrylate rubber and a phosphonium salt of the following general formula incorporated therein:

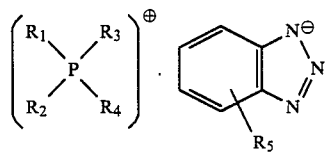

wherein $R_1$, $R_2$, $R_3$ and $R_4$ are selected from the group consisting of hydrocarbon groups having 1 to 20 carbon atoms, secondary and tertiary amino groups substituted with a hydrocarbon group having 1 to 20 carbon atoms and fluoroalkyl groups having 1 to 20 carbon atoms, with the proviso that the case where all of $R_1$, $R_2$, $R_3$ and $R_4$ are secondary or tertiary amino groups or fluoroalkyl groups is excluded, and $R_5$ stands for a hydrogen atom or an alkyl group having 1 to 20 carbon atoms, and curing them.

9 Claims, No Drawings

PROCESS FOR PREPARATION OF RUBBER LAMINATE

BACKGROUND OF THE INVENTION

The present invention relates to a process for the preparation of a rubber laminate. More specifically, the present invention relates to a process for the preparation of a laminate comprising a layer of a cured fluororubber and a layer of a cured epoxy group-containing acrylate rubber, which are tightly bonded to each other.

The properties required of rubber materials have recently become severe especially in industrial uses and the automobile-related industries.

A fluororubber is excellent in such properties as heat resistance, oil resistance, chemical resistance, solvent resistance and gas barrier property, so that it is widely used in various field where these excellent properties can be utilized.

Although the fluororubber has these excellent properties, it is more expensive than an acrylonitrilebutadiene rubber and an epoxy group-containing acrylate rubber (hereinafter referred to as "AR") and is defective in that the cold resistance is poor.

Therefore, a laminate comprising a layer of an ordinary rubber composition formed on a layer of a fluororubber composition having the above-mentioned excellent properties has attracted attention in the art.

In case of hoses and diaphragms, the fluororubber is most suitable for the inner layer in contact with an oil, gasoline or a chemical, but its properties are too good for the outer layer and AR is sufficient for the outer layer from the viewpoint of the heat resistance, oil resistance or cost.

Cure-bonding of the fluororubber to AR is very difficult according to customary procedures or the bonding force is so weak that no laminate having an excellent bonding force has been provided.

As the means for eliminating this disadvantage, there have been proposed a process in which a guanidine compound is added as a curing agent to AR (see Japanese Patent Application Kokai Publication No. 61-171981 and a process in which a peroxide and a crosslinking assistant are added (see Japanese Patent Application Kokai Publication No. 61-179735). However, in these processes, the design of the rubber composition is restricted by the curing system used or the like, and the physical properties of laminates formed according to the teachings of these patent publications are not fully satisfactory.

SUMMARY OF THE INVENTION

It is therefore a primary object of the present invention to provide a process for the preparation of a rubber laminate which is improved in the cost and cold resistance while retaining excellent properties of a fluororubber.

Another object of the present invention is to provide a process for the preparation of a laminate comprising a cured fluororubber layer and a cured AR layer.

In accordance with the present invention, these objects can be attained by a process for the preparation of a rubber laminate, which comprises bringing an uncured composition comprising a fluororubber and a metal oxide incorporated therein into contact with an uncured composition comprising an epoxy group-containing acrylate rubber and a phosphonium salt of the following general formula incorporated therein:

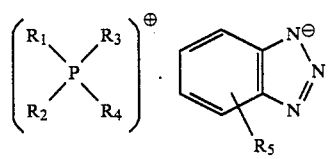

wherein $R_1$, $R_2$, $R_3$ and $R_4$ are selected from the group consisting of hydrocarbon groups having 1 to 20 carbon atoms, secondary and tertiary amino groups substituted with a hydrocarbon group having 1 to 20 carbon atoms and fluoroalkyl groups having 1 to 20 carbon atoms, with the proviso that the case where all of $R_1$, $R_2$, $R_3$ and $R_4$ are secondary or tertiary amino groups or fluoroalkyl groups is excluded, and $R_5$ stands for a hydrogen atom or an alkyl group having 1 to 20 carbon atoms, and curing them.

DETAILED DESCRIPTION OF THE PREFERRED EMBODIMENTS

As the fluororubber used in the present invention, there can be mentioned rubbery polymers of fluorinated unsaturated monomers such as vinylidene fluoride, hexafluoropropene, tetrafluoroethylene, pentafluoropropene, trifluoroethylene, trifluorochloroethylene, vinyl fluoride, perfluoromethyl vinyl ether and perfluoromethyl vinyl ether, and rubbery copolymers of these unsaturated monomers with monomers copolymerizable therewith. As the monomer copolymerizable with the fluorinated unsaturated monomer, there can be mentioned lower olefins such as ethylene and propylene.

Among these fluororubbers, a vinylidene fluoride/hexafluoropropene copolymer and a vinylidene fluoride/hexafluoropropene/tetrafluoroethylene terpolymer are especially preferred.

The epoxy group-containing acrylate elastomer (AR) used in the present invention is an elastomer obtained by copolymerizing 0.1 to 10% by weight, preferably 0.5 to 3% by weight, of an epoxy group-containing monomer acting as the crosslinking point, 30 to 99.9% by weight of at least one monomer selected from the group consisting of alkyl acrylates and alkoxyalkyl acrylates and up to 70% by weight of at least one monomer having a copolymerizable vinyl or vinylidene terminal group copolymerizable with said monomers.

As the epoxy group-containing monomer acting as the crosslinking point, there can be mentioned glycidyl acrylate, glycidyl methacrylate, vinyl glycidyl ether, allyl glycidyl ether and methallyl glycidyl ether. Among these monomers, glycidyl acrylate and glycidyl methacrylate are especially preferred.

As the alkyl acrylate copolymerizable with the epoxy group-containing monomer, there can be mentioned alkyl acrylates having 1 to 8 carbon atoms in the alkyl group, such as methyl acrylate, ethyl acrylate, propyl acrylate, butyl acrylate, 2-ethylhexyl acrylate and n-octyl acrylate.

As the alkoxyalkyl acrylate, there can be mentioned alkoxyalkyl acrylates having 1 to 4 carbon atoms in each of the alkoxy and alkylene groups, such as methoxymethyl acrylate, methoxyethyl acrylate, ethoxyethyl acrylate, butoxyethyl acrylate and methoxyethoxyethyl acrylate.

As the monomer having a terminal vinyl or vinylidene group copolymerizable with the epoxy group-containing monomer, there can be mentioned vinyl esters such as vinyl acetate, vinyl propionate and vinyl butyrate, α-monoolefins such as ethylene, propylene and 1-butene, vinyl ketones such as methyl vinyl ketone and ethyl vinyl ketone, vinyl aromatic compounds such as styrene, α-methylstyrene and vinyltoluene, vinyl ethers such as vinyl ethyl ether and allyl methyl ether, vinyl and vinylidene nitriles such as acrylonitrile and methacrylonitrile, hydroxyl-containing vinyl monomers such as 2-hydroxyethyl acrylate and 4-hydroxybutyl acrylate, cyano-substituted vinyl monomers such as 2-cyanoethyl acrylate, 3-cyanopropyl acrylate and 4-cyanobutyl acrylate, vinyl and vinylidene amides such as acrylamide, methacrylamide and N-methylolacrylamide, vinylidene acrylates such as methyl methacrylate, ethyl methacrylate and butyl methacrylate, and conjugated dienes such as butadiene and isoprene. These monomers can be used singly or in the form of mixtures of two or more of them.

As the epoxy group-containing acrylate elastomer, there can be mentioned an epoxy group-containing acrylate copolymer elastomer, an epoxy group-containing ethylene/acrylate copolymer elastomer, an epoxy group-containing ethylene/vinyl acetate/acrylate copolymer elastomer, an epoxy group-containing acrylate/acrylonitrile copolymer elastomer, an epoxy group-containing acrylate/vinyl acetate/acrylonitrile copolymer elastomer and an epoxy group-containing acrylate/butadiene/acrylonitrile copolymer elastomer. However, elastomers that can be used in the present invention are not limited to those exemplified above.

As the metal oxide used as the component of the curing system for the fluororubber, there can be mentioned CaO, MgO, PbO, $PbO_3O_4$, BaO and $Al_2O_3$, among which MgO is especially preferred. The amount of the metal oxide used is 1 to 30 parts by weight per 100 parts by weight of the fluororubber, and the amount of the metal oxide is appropriately varied within this range according to the curing system.

The phosphonium salt used as the component of the curing system for AR is represented by the following general formula:

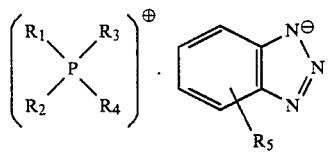

wherein $R_1$, $R_2$, $R_3$ and $R_4$ are selected from the group consisting of hydrocarbon groups having 1 to 20 carbon atoms, secondary and tertiary amino groups substituted with a hydrocarbon group having 1 to 20 carbon atoms and fluoroalkyl groups having 1 to 20 carbon atoms, with the proviso that the case where all of $R_1$, $R_2$, $R_3$ and $R_4$ are secondary or tertiary amino groups or fluoroalkyl groups is excluded, and $R_5$ stands for a hydrogen atom or an alkyl group having 1 to 20 carbon atoms.

As the hydrocarbon group, there can be mentioned alkyl groups such as methyl, ethyl, butyl, ethylhexyl and dodecyl groups, cycloalkyl groups such as a cyclohexyl group, aralkyl groups such as benzyl and methylbenzyl groups, and aryl and substituted aryl groups such as phenyl, naphthyl and butylphenyl groups.

As the secondary and tertiary amino groups, there can be mentioned alkylamino and arylamino groups such as methylamino, ethylamino, anilino, dimethylamino and diethylamino groups, and fluoroalkyl groups such as trifluoromethyl, tetrafluoropropyl and octafluoropentyl groups.

$R_5$ stands for a hydrogen atom or an alkyl group having 1 to 20 carbon atoms. As the alkyl group, there can be mentioned methyl, ethyl, butyl, ethylhexyl and dodecyl groups.

As specific examples of the phosphonium salt, there can be mentioned tetrabutyl-, tetraoctyl-, methyltrioctyl-, butyltrioctyl-, phenyltributyl-, benzyltributyl-, benzyltri- cyclohexyl-, benzyltrioctyl-, butyltriphenyl-, octyltriphenyl-, benzyltriphenyl-, tetraphenyl-, diphenyldi(diethylamino)-, phenylbenzyldi(dimethylamino)-, phenylbenzyldi(diethylamino)-, tri(trifluoromethylbenzyl)- and tetrafluoropropyltrioctyl-phosphonium benzotrianolates and tolyltriazolates.

The amount of the phosphonium salt used is 1 to 10 parts by weight per 100 parts by weight of AR. When the amount of the phosphonium salt is smaller than 1 part by weight, no laminate having a good bonding strength can be obtained. When the amount of the phosphonium salt exceeds 10 parts by weight, the curing speed of AR is largely reduced, which is impractical.

The phosphonium salt can be incorporated in not only AR but also the fluororubber. In the case where the phosphonium salt is incorporated in both of the fluororubber and AR, a laminate comprising a cured fluororubber layer and a cured AR layer, which are tightly bonded to each other, can be obtained as in the case where the phosphonium salt is incorporated into AR alone. The amount of the phosphonium salt added to the fluororubber is 1 to 10 parts by weight per 100 parts by weight of the fluororubber.

Known additives such as a crosslinking agent, a crosslinking promoter, a reinforcer, for example, carbon black or silica, a filler, a softener, a plasticizer, an age resister, a stabilizer and a processing assistant can be added to the fluororubber and AR in addition to the above-mentioned metal oxide and phosphonium salt.

In the present invention, an uncured composition comprising the fluororubber and the metal oxide or the like incorporated therein and another uncured composition comprising AR and the phosphonium salt or the like incorporated therein are independently kneaded and molded into sheets having an appropriate thickness according to the known procedures. Both the composition sheets are brought into contact with each other in an uncured state and both the rubber sheets are cure-bonded by carrying out curing under compression by using a hot press or curing vessel, whereby a laminate is obtained.

Alternatively, there can be adopted a method in which both the compositions are molded into a laminated tube by two-layer extrusion and the laminated tube is cured under compression by using a curing vessel.

The hot pressing is generally carried out at a temperature of 140° to 200° C. under a pressure of 20 to 150 kg/cm² for 5 to 60 minutes. When the curing vessel is used, compression curing is generally carried out at a temperature of 130° to 160° C. under a pressure of 1.8 to 5.5 kg/cm² for 30 to 120 minutes.

When the obtained laminate is heat-treated (postcured), the primary curing time can be shortened and the permanent compression set can be improved.

As is apparent from the foregoing description, a laminate in which a cured fluororubber layer and a cured AR layer are tightly bonded to each other can be obtained.

This laminate retains excellent properties of the fluororubber, and the use of AR serves to reduce the cost of the fluororubber and greatly improve the poor cold resistance, which is a defect of the fluororubber.

Accordingly, the laminate of the present invention can be widely used as a composite material for hoses, diaphragms, gaskets, oil seals and packings by utilizing excellent heat resistance, oil resistance, chemical resistance, solvent resistance and gas barrier property of the fluororubber.

The present invention will now be described in detail with reference to the following Examples. In the Examples and Comparative Examples, all of "parts" and "%" are by weight unless otherwise stated.

EXAMPLE 1

An AR composition shown in Table 1 and a fluororubber composition shown in Table 2 were independently kneaded and molded into uniform sheets having a thickness of about 2 mm by using a 6-inch open roll. The sheets were cut into rectangular strips having a size of 6 cm × 10 cm and laminated according to a combination shown in Table 3 and a laminate was prepared at a pressing pressure of 40 kg/cm² under conditions shown in Table 3.

In the peeling test, cellophane paper was inserted into a part to be gripped by a chuck so as to avoid adherence of both the sheets. This test piece was subjected to the peeling test at a pulling speed of 50 mm/min according to JIS K 6301 to measure the peel strength. The obtained results are shown in Table 3.

It is apparent from this table that according to the present invention, the fluororubber and AR are laminated with each other with a strong bonding force even after primary curing and post-curing.

TABLE 1

| Recipe | Sample | | | | | | | |
|---|---|---|---|---|---|---|---|---|
| | A1 | A2 | A3 | A4 | A5 | A6 | A7 | A8 |
| epoxy group-containing acrylate rubber *1 | 100 | 100 | — | — | 100 | 100 | — | — |
| epoxy group-containing acrylate rubber *2 | — | — | 100 | 100 | — | — | 100 | 100 |
| stearic acid | 1 | 1 | 1 | 1 | 1 | 1 | 1 | 1 |
| carbon black (MAF) | 60 | 60 | 60 | 60 | 60 | 60 | 60 | 60 |
| ammonium benzoate | 1.5 | — | 1.5 | — | 1.5 | — | 1.5 | — |
| zinc dimethyldithiocarbamate | — | 2.5 | — | 2.5 | — | 2.5 | — | 2.5 |
| ferric dimethyldithiocarbamate | — | 0.5 | — | 0.5 | — | 0.5 | — | 0.5 |
| sulfonamide derivative curing retarder | — | 0.5 | — | 0.5 | — | 0.5 | — | 0.5 |
| tetrabutylphosphonium benzotriazolate | — | — | — | — | 2 | 2 | 2 | 2 |

Note
*1: Nipol AR42W supplied by Nippon Zeon
*2: Nipol AR53 supplied by Nippon Zeon

TABLE 2

| Sample Recipe | F1 |
|---|---|
| fluororubber *1 | 100 |
| magnesium oxide | 3 |
| calcium hydroxide | 6 |
| carbon black (MT) | 20 |
| Tecnoflon M₁ *2 | 3.6 |
| Tecnoflon M₂ *3 | 1.6 |

Note
*1: Tecnoflon NM supplied by Monte Fluos
*2: curing promotor supplied by Monte Fluos
*3: curing promoter supplied by Monte Fluos

TABLE 3

| | Combination | | Peel strength (kg/inch) | |
|---|---|---|---|---|
| | AR composition | fluororubber composition | curing conditions *1 | curing conditions *2 |
| Comp. Ex. | A1 | F1 | not bonded | not bonded |
| | A2 | F1 | " | " |
| | A3 | F1 | " | " |
| | A4 | F1 | " | " |
| Ex. | A5 | F1 | 7.3 | 7.8 |
| | A6 | F1 | 8.5 | 12.1 |
| | A7 | F1 | 6.2 | 8.6 |
| | A8 | F1 | 8.3 | 9.4 |

Note
*1: heated at 170° C. for 20 minutes
*2: heated at 170° C. for 20 minutes and post-cured at 150° C. for 4 hours

EXAMPLE 2

An AR composition shown in Table 4 and the fluororubber composition shown in Table 2 were kneaded and molded into test pieces in the same manner as that described in Example 1, and the peel strength was measured.

The obtained results are shown in Table 5. It is apparent from these results that when a specific phosphonium salt is incorporated in an amount of at least 1.0 part by weight into AR and a metal oxide is incorporated into a fluororubber, a rubber laminate in which the AR and fluororubber are tightly cure-bonded to each other can be obtained.

TABLE 4

| Recipe | Sample | | | | | | | |
|---|---|---|---|---|---|---|---|---|
| | A9 | A10 | A11 | A12 | A13 | A14 | A15 | A16 |
| epoxy group-containing | 100 | 100 | 100 | 100 | 100 | 100 | 100 | 100 |

TABLE 4-continued

| Recipe | Sample | | | | | | | |
|---|---|---|---|---|---|---|---|---|
| | A9 | A10 | A11 | A12 | A13 | A14 | A15 | A16 |
| acrylate rubber *1 | | | | | | | | |
| stearic acid | 1 | 1 | 1 | 1 | 1 | 1 | 1 | 1 |
| carbon black (MAF) | 60 | 60 | 60 | 60 | 60 | 60 | 60 | 60 |
| ammonium benzoate | 1.5 | 1.5 | 1.5 | 1.5 | — | — | — | — |
| zinc dimethyldithiocarbamate | — | — | — | — | 2.5 | 2.5 | 2.5 | 2.5 |
| ferric dimethyldithiocarbamate | — | — | — | — | 0.5 | 0.5 | 0.5 | 0.5 |
| sulfonamide derivative curing retarder | — | — | — | — | 0.5 | 0.5 | 0.5 | 0.5 |
| tetrabutylphosphonium benzotriazolate | — | 1 | 2 | 3 | — | 1 | 2 | 3 |

Note
*1: Nipol AR53 supplied by Nippon Zeon

TABLE 5

| Combination | | Peel strength (kg/inch) | |
|---|---|---|---|
| AR composition | fluororubber composition | curing conditions *1 | curing conditions *2 |
| Comp. Ex. A9 | F1 | not bonded | not bonded |
| Ex. A13 | F1 | " | " |
| Ex. A10 | F1 | 6.0 | 6.8 |
| A11 | F1 | 6.2 | 8.6 |
| A12 | F1 | 5.9 | 7.3 |
| A14 | F1 | 7.4 | 14.8 |
| A15 | F1 | 8.3 | 9.4 |
| A16 | F1 | 10.1 | 9.4 |

Note
*1, *2: same as in Table 3

What is claimed is:

1. A process for the preparation of a rubber laminate, which comprises bringing an uncured composition comprising a fluororubber and a metal oxide incorporated therein into contact with an uncured composition comprising an epoxy group-containing acrylate rubber and a phosphonium salt of the following general formula incorporated therein:

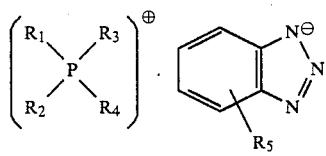

wherein $R_1$, $R_2$, $R_3$ and $R_4$ are selected from the group consisting of hydrocarbon groups having 1 to 20 carbon atoms, secondary and tertiary amino groups substituted with a hydrocarbon group having 1 to 20 carbon atoms and fluoroalkyl groups having 1 to 20 carbon atoms, with the proviso that the case where all of $R_1$, $R_2$, $R_3$ and $R_4$ are secondary or tertiary amino groups or fluoroalkyl groups is excluded, and $R_5$ stands for a hydrogen atom or an alkyl group having 1 to 20 carbon atoms, and curing the uncured compositions.

2. A process according to claim 1, wherein the fluororubber is one selected from the group consisting of rubbery polymers of fluorinated unsaturated monomers and rubbery copolymers of said unsaturated monomers with other copolymerizable monomers 3. A process according to claim 1, wherein the fluororubber is one selected from the group consisting of a vinylidene fluoride/hexafluoropropene copolymer rubber and a vinylidene fluoride/hexafluoropropene/tetrafluoroethylene terpolymer rubber.

4. A process according to claim 1, wherein the epoxy group-containing acrylate rubber is a rubbery copolymer of an epoxy group-containing monomer with at least one monomer selected from the group consisting of copolymerizable vinyl-terminated monomers and copolymerizable vinylidene group-containing monomers.

5. A process according to claim 1, wherein the metal oxide is at least one oxide selected from the group consisting of CaO, MgO, PbO, $Pb_3O_4$, BaO and $Al_2O_3$.

6. A process according to claim 1, wherein the hydrocarbon group is a member selected from the group consisting of alkyl, cycloalkyl, aralkyl, aryl and substituted aryl groups.

7. A process according to claim 1, wherein the secondary amino or tertiary amino group is a member selected from the group consisting of alkylamino and arylamino groups.

8. A process according to claim 1, wherein the amount of the metal oxide used is 1 to 30 parts by weight per 100 parts by weight of the fluororubber.

9. A process according to claim 1, wherein the amount of the phosphonium salt used is 1 to 10 parts by weight per 100 parts by weight of the epoxy group-containing acrylate rubber.

* * * * *